(12) United States Patent
Schafer et al.

(10) Patent No.: US 8,992,148 B2
(45) Date of Patent: Mar. 31, 2015

(54) LOCKING CONNECTOR

(75) Inventors: Ralph D. Schafer, Douglassville, PA (US); Perry L. Moyer, Barto, PA (US)

(73) Assignee: Micro-Coax, Inc., Pottstown, PA (US)

( * ) Notice: Subject to any disclaimer, the term of this patent is extended or adjusted under 35 U.S.C. 154(b) by 109 days.

(21) Appl. No.: 13/603,976

(22) Filed: Sep. 5, 2012

(65) Prior Publication Data

US 2013/0072048 A1 Mar. 21, 2013

Related U.S. Application Data

(60) Provisional application No. 61/536,746, filed on Sep. 20, 2011.

(51) Int. Cl.
  *H01R 13/639* (2006.01)
  *H01R 13/622* (2006.01)
  *H01R 13/74* (2006.01)

(52) U.S. Cl.
  CPC ............ *H01R 13/622* (2013.01); *H01R 13/639* (2013.01); *H01R 13/746* (2013.01)
  USPC .............................. 411/198; 439/321; 285/92

(58) Field of Classification Search
  CPC ............................... F16L 19/005; H01R 13/639
  USPC ................. 411/119, 120, 197, 198, 321, 322; 439/321; 285/92
  See application file for complete search history.

(56) References Cited

U.S. PATENT DOCUMENTS

| | | | | |
|---|---|---|---|---|
| 1,580,694 A | * | 4/1926 | Smith | 251/89.5 |
| 2,709,608 A | * | 5/1955 | Smith | 403/319 |
| 2,728,895 A | * | 12/1955 | Quackenbush et al. | 439/321 |
| 2,956,604 A | * | 10/1960 | Crotty | 411/322 |
| 3,581,609 A | * | 6/1971 | Greenwood | 81/124.7 |
| 3,670,795 A | * | 6/1972 | Kupfrian | 411/195 |
| 3,942,570 A | * | 3/1976 | Bochman et al. | 411/220 |
| 4,053,195 A | | 10/1977 | Laverick et al. | |
| 4,285,564 A | * | 8/1981 | Spinner | 439/321 |
| 5,094,491 A | * | 3/1992 | Berghammer et al. | 285/92 |
| 5,188,398 A | * | 2/1993 | Parimore et al. | 285/39 |
| 5,269,566 A | * | 12/1993 | Do et al. | 285/39 |
| 5,653,605 A | | 8/1997 | Woehl et al. | |
| 5,823,702 A | * | 10/1998 | Bynum | 403/320 |
| 5,846,042 A | * | 12/1998 | Iannuzzi | 411/120 |
| 5,882,044 A | * | 3/1999 | Sloane | 285/92 |
| 6,293,595 B1 | * | 9/2001 | Marc et al. | 285/92 |
| 7,883,117 B2 | * | 2/2011 | Marc et al. | 285/86 |
| 8,403,611 B2 | * | 3/2013 | Friesen et al. | 411/197 |
| 2010/0297871 A1 | | 11/2010 | Haube | |
| 2010/0323541 A1 | | 12/2010 | Amidon et al. | |
| 2011/0097928 A1 | | 4/2011 | Burris et al. | |
| 2012/0301248 A1 | * | 11/2012 | Arnold et al. | 411/347 |
| 2013/0149031 A1 | * | 6/2013 | Changsrivong et al. | 403/376 |

* cited by examiner

*Primary Examiner* — Flemming Saether
(74) *Attorney, Agent, or Firm* — Drinker Biddle & Reath LLP

(57) ABSTRACT

A self-locking connector system has a connector member having an external thread and an axially extending keyway, and a connecting interface at a distal end. A connector body has a distal end with a connecting interface that mates with the connecting interface of the connector member. An internally threaded nut is captive on the distal end of the connector body encircling the connecting interface and is configured to screw onto the externally threaded connector member. A locking collar is dimensioned to encircle the externally threaded connector member, has at least one key dimensioned to engage in the keyway, and is movable axially on the nut between a first position in which the nut is rotatable relative to the collar and a second position in which the nut is not rotatable relative to the collar.

15 Claims, 7 Drawing Sheets

DETAIL 7A

LOCKING CONNECTOR

FIELD OF THE INVENTION

The invention pertains to a connector to interconnect the mating ends of connector bodies, and for holding coaxial cables and other conduits for material or data coupled together, including connecting an end of a cable or other flexible conduit to a post or other connector mounted to a solid object.

BACKGROUND OF THE INVENTION

It is well known to connect coaxial cables, hosepipes, and other conduits for material or data end-to-end by providing a connector member with an external screw thread on one conduit end, and an internally threaded nut rotatable but captive on a connector body at the other conduit end.

It is well known that connectors used on satellites, military aircraft, and missile systems experience several Gs of shock and high amplitudes of vibration, which can cause the nuts to loosen, which degrades signal performance. The risk of loosening in use can be reduced by screwing up the nut very tightly. However, the externally threaded member may be a post mounted on an external panel of a device to which the cable is to be attached. Such posts are typically mounted by screwing the threaded post into a threaded hole in the panel, or by passing the threaded post through a hole in the panel and screwing a retaining nut onto it. The tighter the nut is screwed onto the post, the more likely it is that the post will turn and loosen its own mounting. As a result, even during system assembly, companies can incur major repair costs, because it becomes necessary to pull the subsystems out to re-tighten loosened nuts and posts.

Connector designs have previously been proposed, manufactured and used to assure that their mating parts will be locked together and cannot be accidentally loosened as a result of shock or vibration. These design approaches include such techniques as lock wire nuts, secondary nuts, cotter pins, lock washers, spring loaded locking mechanisms, etc. Although such techniques have proven to be effective in some applications, they involve additional, costly assembly operations and/or additional parts. They may also be difficult to install in crowded locations that may not be easily accessible.

Additionally, some previously proposed designs are not real "true locking" designs, because the nut is locked only to the rear of its own connector body rather than to the mating connector member. In these designs, the connection can loosen if the connector body as a whole rotates relative to the connector member.

FIG. 1 illustrates an example of a previously proposed connector assembly 100, in which a nut 102 with wire holes 104 locks to the mating connector member 106, which has wire holes 108. This is an example of a "true" locking design. A wire 110 passes through the holes 104, 108 in the first and second connectors 102, 106, effectively "locking" them together. The ends of the wire are twisted together at 112. Although this can provide an effective locking mechanism it has several disadvantages. It is time consuming, expensive, and difficult to achieve on crowed system platforms. Also, it is not "cyclical." That is, it cannot be repeatedly attached and released without the destruction and replacement of the wire 110.

FIG. 2 illustrates an alternative previously proposed self-locking connector 120. In this design, the nut 122 has a ramped feature 124 with a spring loaded sleeve 126 that locks the connector from the rear of the body. The spring 128 locks the sleeve to the nut 122 when not retracted, and has a channel 130 that accommodates a locking pin 132. When the sleeve is retracted (to the right in FIG. 2) and turned by a quarter turn, the sleeve 126 is disengaged from the nut 122 and held in the unlocked position. Although fast and easy to use, a disadvantage of this design is that it does not lock the nut 122 to the mating connector or panel 134. If either of the connector halves 134, 136 rotates relative to the other, the nut 122 can loosen or even break free and loss of the electrical signal or environmental seal results.

Referring to FIG. 3, U.S. Pat. No. 5,186,501 to Mano proposes a connector device 140 that has a series of ramps 142 on the distal face of the nut 144 with matching ramps 146 on the adjacent face of an opposing Belleville spring washer 148 that bears against a shoulder 150 of the mating connector member 152. In this case the spring 148 provides a compressive resistive force when the nut 144 is threaded into place, effectively locking the nut 144 to the connector member 152. One disadvantage of this design is that it requires a known spacing between the toothed face 142 of the nut 144 and the shoulder 150 to function correctly. That dimension is effectively determined by the length of the externally screw threaded portion 154 of the connector member 152 from the shoulder 150 to the front end 156 where it mates with the connector body 158 on which the nut 144 is captive. Mano's device is therefore not suitable for use with connector members 152 supplied by unknown third party vendors, where the length of the screw threaded portion 154 cannot be controlled.

In addition, in a panel-mounted configuration, the mounting panel 160 typically overlies the shoulder surface 150 shown in FIG. 3, and the washer 148 bears on the front face of the panel 160, or on a retaining nut (see nut 55 in FIG. 4) screwed against the front face of the panel, and the thickness of the panel usually cannot be controlled. Mano's device is therefore not suitable for use with many panel mounted connectors. Another disadvantage of this design is that it relies on friction at the surfaces where the Belleville washer 146 rests on the shoulder 150, and may not function reliably when lubricants are present on those surfaces. However, if the friction is sufficiently high completely to prevent rotation, the nut 144 cannot be released, so the device becomes non-cyclical.

There is a continuing need for a simple, cyclically reuseable, self-locking connector to interconnect the mating ends of connector bodies, especially in the space, military and aerospace industries, and especially to hold coaxial cables coupled together in a fluid sealed manner and more stringently for continuous radio frequency operation while in the presence of shock and vibration.

SUMMARY OF THE INVENTION

One embodiment of the invention provides a self-locking connector having a connector body having a distal end comprising a connecting interface, an internally threaded nut captive on the distal end of the connector body encircling the connecting interface and configured to screw onto a corresponding externally threaded connector member, and a locking collar that is dimensioned to encircle the clearance diameter of an external screw thread corresponding to the internally threaded nut, that has at least one key projecting radially within said clearance diameter, and that is movable axially on the nut between a first position in which the nut is rotatable relative to the collar and a second position in which the nut is not rotatable relative to the collar.

Another embodiment of the invention provides a connector system comprising such a connector in combination with a connector member having an external thread with an axially extending keyway configured to receive and engage the key of the retaining collar, and having a connecting interface at a distal end configured to mate with the connecting interface of the connector body when the nut is screwed onto the external thread.

A further embodiment of the invention provides a self-locking connector system comprising a connector member having an external thread with an axially extending keyway, and a connecting interface at a distal end, a connector body having a distal end comprising a connecting interface operative to mate with that of the connector member, an internally threaded nut captive on the distal end of the connector body encircling the connecting interface and configured to screw onto the externally threaded connector member, and a locking collar that is dimensioned to encircle the externally threaded connector member, that has at least one key dimensioned to engage in said keyway, and that is movable axially on the nut between a first position in which the nut is rotatable relative to the collar and a second position in which the nut is not rotatable relative to the collar.

Another embodiment of the invention provides a self-contained, self-locking connector comprising first and second connector bodies, a nut, a locking collar and a spring. The first body has an annular intermediate shoulder and a threaded end with a D-flat axially along the threads, the second connector body has a snap ring groove utilizing a snap ring for a rotational nut having teeth on its outside diameter for locking, with two glands or grooves to accommodate a spring providing a locked and unlocked position for the sleeve, and a snap ring groove which also utilizes the snap ring to engage second connector body to bring the two connector bodies into an axially aligned mating and sealing condition as the nut is tightened onto the threaded end of the first connector body, with a counter-bored locking collar interposed between the first connector body and the nut, having a spring gland utilizing a spring and teeth that engage the teeth of the nut. The first spring gland groove of the nut positions the teeth of the sleeve so that the sleeve remains disengaged while the nut is free to rotate on the spring. The second gland groove positions the sleeve so that it engages the teeth of the nut preventing rotation. The D-flats of the sleeve and the first connector body axially align during installation of the sleeve preventing rotation. When the sleeve is engaged into its locked position, the second gland, it effectively locks the nut to the first connector body.

A further embodiment of the invention provides a constitutive, electrical and environmental connector that successfully integrates complementing D-flats between the mating connector body and a counter bored sleeve utilizing a canted coil spring and an interlocking toothed structure that effectively allows the nut and sleeve to be self-contained when locked to the mating connector.

Embodiments of the present invention make it possible to provide a "true" self-locking connector that overcomes or mitigates some or all of the various disadvantages described above.

Embodiments of the present invention can be used very effectively in low profile applications, including right angle connectors with low profiles, and are easily adaptable to other connector types or families.

Additionally, many embodiments of the present invention allow the second body to rotate when the sleeve is in the locked position without losing its ability to seal. This allows torsion stress to be relieved without compromising the integrity of the sealed interface.

BRIEF DESCRIPTION OF THE DRAWINGS

The above and other aspects, features and advantages of the present invention will be apparent from the following more particular description thereof, presented in conjunction with the following drawings. In the drawings:

FIG. 4A is an enlarged detail of FIG. 4.

FIG. 7A is an enlarged detail of FIG. 7.

DETAILED DESCRIPTION OF THE PREFERRED EMBODIMENTS

A better understanding of various features and advantages of the present invention will be obtained by reference to the following detailed description of embodiments of the invention and accompanying drawings, which set forth illustrative embodiments that utilize particular principles of the invention.

Figure 1:
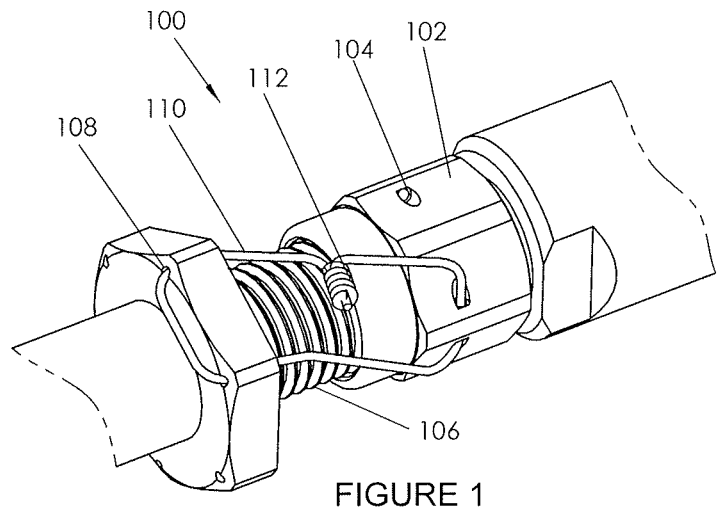
FIG. 1 is an isometric view of a first previously proposed connector, utilizing a wire to secure a nut to a mating connector.
Figure 2:
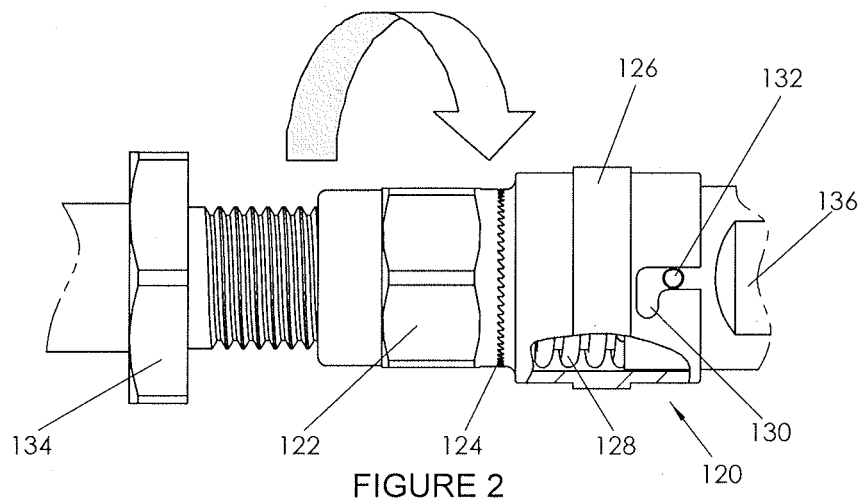
FIG. 2 is a side view of a second previously proposed connector, with ramped teeth.
Figure 3:
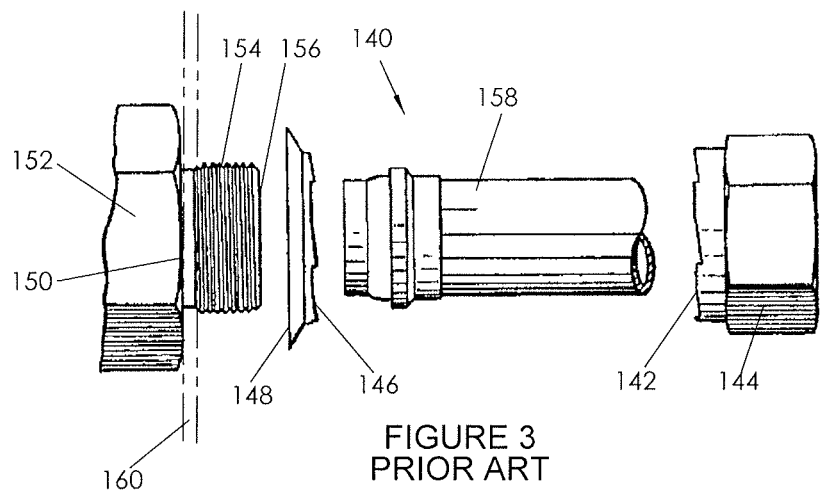
FIG. 3: is an exploded side view of a third previously proposed connector, utilizing a Belleville washer as the locking mechanism.
Figure 4:
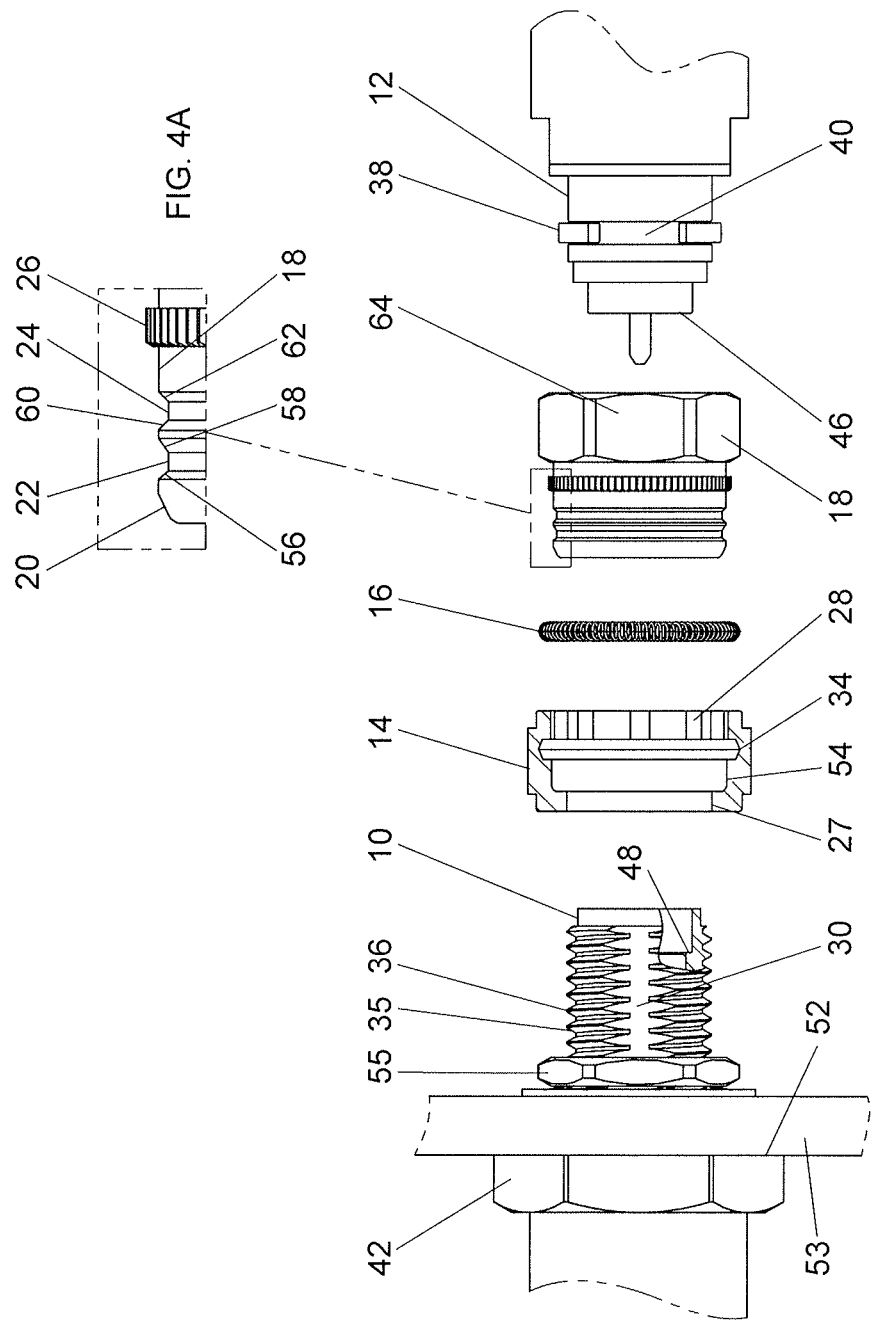
FIG. 4 is an exploded side view, partly in section, of a first connector according to an embodiment of the present invention.

Referring to FIGS. 4 to 7A, and initially to FIG. 4, one embodiment of a connector for a coaxial cable according to an embodiment of the invention comprises a first body or connector member 10 having a threaded distal end 35 with at least one keyway in the form of a D-flat 30 axially along the threads 36. An annular sealing surface 48 is provided in the open end of the distal end 35 of connector member 10. Connector member 10 is also provided with a hexagonal structure 42 that can be grasped by a wrench for tightening. The distal face of hexagonal structure 42 defines a shoulder 52 that abuts the rear face of a panel 53 for mounting. Connector member 10 may be secured to panel 53 by passing distal end 35 through a hole in panel 53 and screwing a nut 55 onto threads 36 and against the front face of panel 53. Connector member 10 then forms a connector post projecting from panel 53.

The connector assembly further comprises a second connector body 12. Second connector body 12 has an annular groove 40 that accommodates a snap ring 38, and has a sealing surface 46 adjacent to its distal end that mates with the sealing surface 48 of distal end 35 of connector member 10.

A nut 18 is mounted on body 12 by an internal groove 44 (see FIG. 6) that receives snap ring 38. Grooves 40 and 44 are dimensioned so that snap ring 38 can be compressed into groove 40 to permit nut 18 to be slid over snap ring 38. Groove 44 then permits snap ring 38 to expand to a diameter at which it is partly in groove 40 and partly in groove 44, and prevents any significant axial movement of nut 18 relative to connector body 12 while permitting free relative rotation of nut 18 and connector body 12. Nut 18 has a hexagonal structure 64 that can be grasped by a wrench for tightening and loosening.

As best shown in FIG. 4A, nut 18 has, in order from its distal end, a lead-in ramp 20, two gland grooves 22, 24 with sloped sides that form entry and exit ramps 56, 58, 60, & 62, in that order, and a ring of external axially extending splines or teeth 26 for locking. In use, a canted coil spring 16 moves axially into and out of the grooves 22, 24, and the angles of the ramps 20, 56, 58, 60, & 62 controls the force necessary for those movements, as will be explained in more detail below. A canted coil spring is an open-coil spring in which the individual turns of the coil are canted, or slanted, relative to the overall direction of the coil, allowing the coil to be compressed sideways comparatively easily without permanent deformation. Such springs are commercially available from Bal Seal Engineering, Inc. of Foothill Ranch, Calif., U.S.A.

A locking collar 14 has an internal bore 54 that will fit over the part of the nut 18 with the grooves 22, 24, and has a groove 34 that receives and holds the canted coil spring 16. At its distal end, the locking collar 14 has an aperture 27 the diameter of which is a clearance diameter for the threads 36 on the connector body 10. The aperture 27 has a key in the form of a chordal flat 32 (see FIG. 9) that fits the D-flat 30, so that the locking collar 14 can slide along the distal portion 35 of connecting member 10 but cannot rotate relative to connecting member 10. The thickness of the key (the part of locking collar 14 forming the chordal flat 32), measured in the axial direction, is greater than the space between the threads 36 of threaded end 35, in order to prevent the chordal flat 32 slipping between the threads and allowing locking collar 14 either to rotate or to jam.

Locking collar 14 has internal teeth or splines 28, positioned so that when groove 34 in locking collar 14 is aligned with groove 24 on nut 18, splines 28 engage with splines 26, and prevent relative rotation of locking collar 14 and nut 18. Because the key 32 and keyway 30 already prevent relative rotation of the locking collar 14 and threaded end 35, the combined effect of features 26, 28, 32, and 30 is to prevent relative rotation of nut 18 and threaded connecting member 10, effectively locking the threaded connection. However, connector body 12 can still rotate relative to the locked components because of the connection formed by snap ring 38. When groove 34 in locking collar 14 is aligned with groove 22 on nut 18, splines 28 disengage from splines 26, and permit free relative rotation of locking collar 14 and nut 18.

Alternatively, if for any reason it was desired to prevent connector body 12 rotating relative to connecting member 10, the rear end of nut 18 could also be locked to connector body 12, or locking collar 14 could also be locked to connector body 12 inside nut 18, by an additional set of teeth or splines similar in construction and function to teeth 26, 28.

To assemble the female part of the connector system, snap ring 38 is inserted into groove 40 in connector body 12, and compressed with a suitable tool. Nut 18 is slid over snap ring 38 until the snap ring expands into groove 44 in nut 18. Nut 18 and connector body 12 are then effectively permanently, but freely rotatably, connected together. A releasable connection could be used instead, but was not considered necessary for this embodiment.

Canted coil spring 16 is then inserted into internal groove 34 in locking collar 14, and locking collar 14 is pushed onto nut 18. The lead-in ramp 20 compresses spring 16 outwards into groove 34, until spring 16 snaps into the first gland groove 22 on nut 18. The locking collar 14 is then effectively captive, but freely rotatable, on nut 18. This is the position shown in FIG. 5. Locking collar 14 can be removed for inspection or replacement of spring 16, but only by exerting sufficient force to push spring 16 back up ramp 56 at the front side of gland groove 22. Ramp 56 is deliberately made steep, so that the necessary force cannot easily be exerted merely by clumsy handling in the field.

Figure 5:
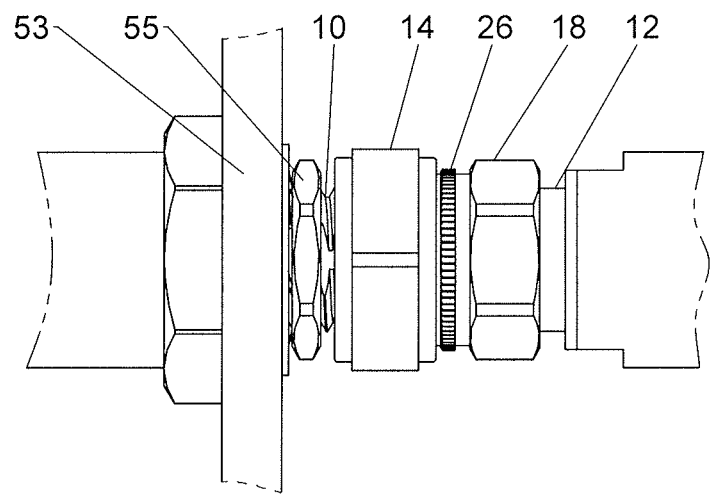
FIG. 5 is a view similar to FIG. 4, showing the connector assembled and mounted, but unlocked.
Figure 5A:
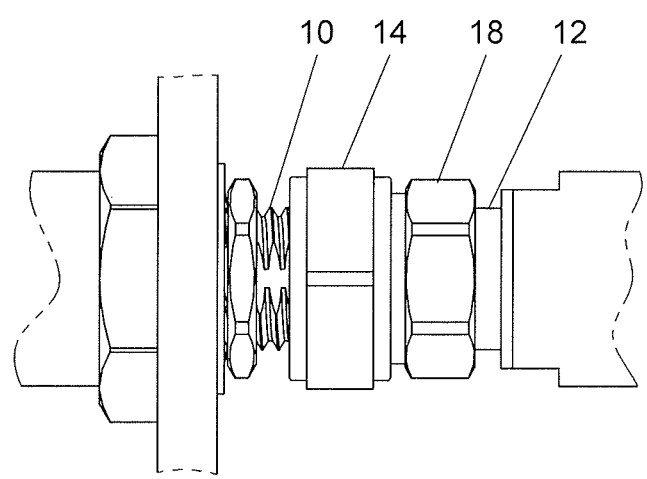
FIG. 5A is a view similar to FIG. 5, showing the connector in the locked position.
Figure 6:
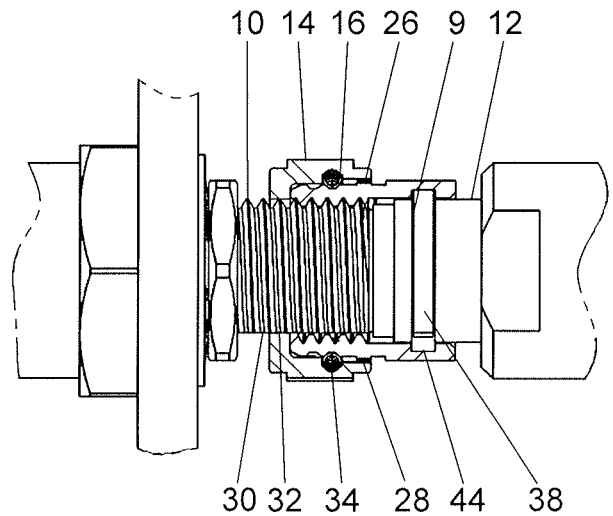
FIG. 6 is a cross sectional view of the connector as shown in FIG. 5A.
Figure 7:
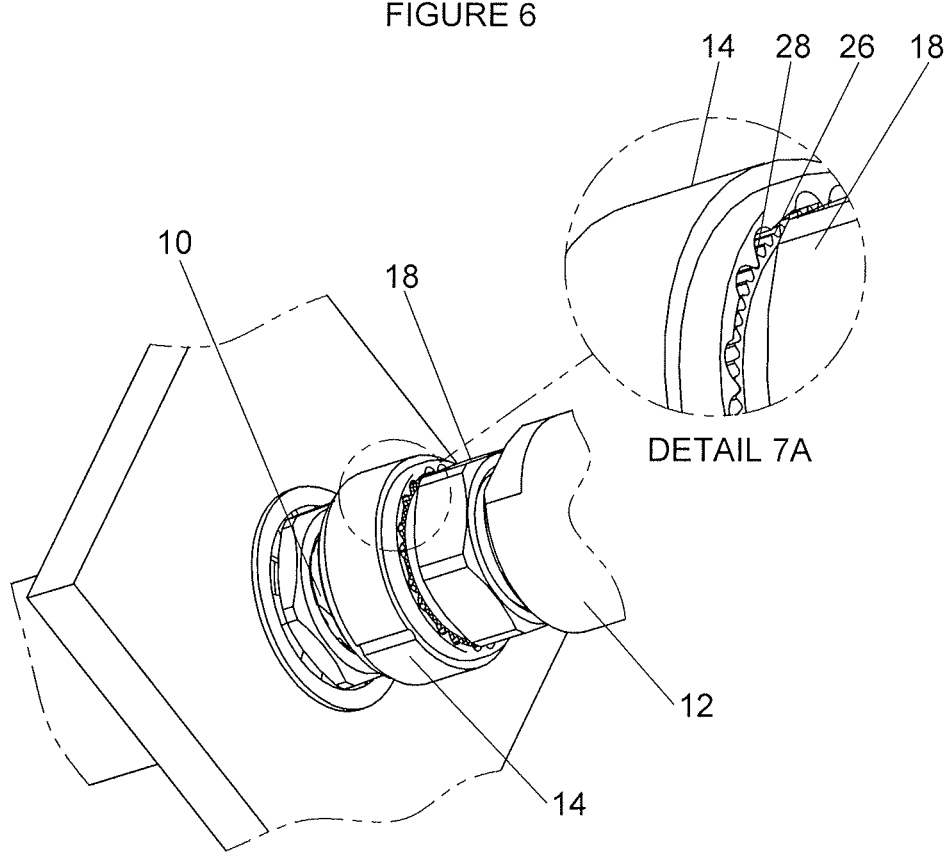
FIG. 7 is an isometric view of the connector as shown in FIGS. 5A and 6.

Locking collar 14 can easily be moved from the unlocked position shown in FIG. 5 to the locked position shown in FIGS. 5A and 6 by pushing it to the right as shown in the drawings, so that the spring 16 slides up ramp 58 and down ramp 60, into groove 24. In that position, splines 26 and 28 are meshed, preventing relative rotation of locking collar 14 and nut 18. Ramp 58 is made with a gentle slope, so that the collar 18 can be moved easily from the unlocked position to the locked position. Ramp 60 is made steeper than ramp 58, so that there is a greater resistance to unlocking, but not as steep as ramp 56. Ramp 62 is sufficiently steep to effectively prevent movement of spring 16 beyond groove 24.

To make a connection, the locking collar 14 is moved to the unlocked position, with the spring 16 in the front groove 22, and the chordal flat 32 is aligned with the D-flat 30 on the threaded end 35 of the locking connector 10. The connector body 12, with the nut 18 and locking collar 14, is then advanced so that the aperture 27 of locking collar 14 slides over threads 36, with chordal flat 32 guided by D-flat 30, until the threads in nut 18 engage the threads 36 on locking connector 10. The nut 18 is then rotated and screwed onto threads 36 in the usual way. Locking collar 14 cannot rotate, and is pushed forwards by ramp 58 pushing spring 16. Connector body 12 does not need to rotate, because of the rotatable connection at snap ring 38. The nut 18 is tightened until the mating surfaces 46, 48 on connector body 12 and connector member 10 meet, forming both an environmental seal and an electrical connection. The inner conductors of the coaxial cable also connect electrically in a manner well known in the art.

As is illustrated by FIG. 5, no engagement is needed between locking ring 14 and retaining nut 55. Provided that the exposed length of threads 36 is not so short that retaining nut 55 actually fouls locking ring 14 before mating surfaces 46, 48 meet, it does not matter how long the exposed length of threads 36 is. Variations in the thickness of panel 53 can therefore be accommodated simply by ensuring that the threads 36 are long enough for the thickest panel 53.

The mating surfaces 46, 48 may be constructed to provide a desired environmental seal. For example, where a coaxial cable has an air space between its outer and central conductors, a watertight seal may be desired to prevent the entry of moisture into the air space. Additional structures and components to provide a desired seal may be provided. Such structures and components may include structures and components that are known in the art and, in the interests of conciseness, are not further shown or described here.

The locking collar 14 is then pulled back, into the locked position shown in FIGS. 5A and 6, with the spring 16 in the second gland groove 24. The splines 26 and 28 mesh, preventing rotation of the nut 18 and thus preventing loosening of the connection. The coaxial cable or whatever else is attached to the connector body 12 can still rotate relative to the connector member 10 at the snap ring 38, avoiding the buildup of torsional forces at the connection.

The connection can be released at any time, by pushing the locking collar 14 forward into the unlocked position of FIG.

5. However, because of the slope of ramp 60, that requires a decisive force, so there is little risk of the connection coming undone merely from ordinary vibration.

The forces required to move the locking collar 14 can be accurately selected for a particular application by choosing the properties of spring 16, the depths of the grooves 22, 24, and the slopes of the ramps 56, 58, 60. Because the ramps can have different slopes, all three forces can be calibrated independently. In general, it is preferred to dimension the grooves 22, 24, 34 and the spring 16 so that the spring is held without axial play, at least in the locked condition. However, other arrangements are possible. In an embodiment, the bottom of at least one of the gland grooves 22, 24, is sloped, so that the spring 16 is controllably tight or loose in the grooves.

As may be seen from the drawings, this embodiment requires scarcely more space than a conventional non-locking connector, so it is well suited for low profile applications, including low profile right-angle applications. Tightening of the nut 18 is no more complicated, and requires no more space on a crowded panel, than a conventional non-locking connector, and the locking action is quick, simple, and also requires little or no additional space.

Thus, connectors can be constructed in accordance with embodiments of the present invention that are easy to use, durable in design, simple and economical in construction and capable of cyclic operation. Even though a particular embodiment of the invention has been described and illustrated above, modifications are possible without violating the true intent and scope of the invention.

Figure 8:
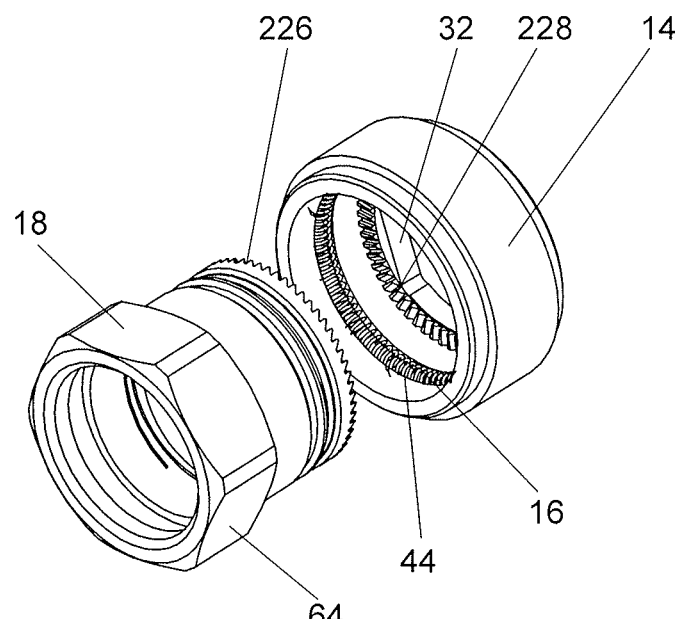
FIG. 8 is an isometric view of parts of an alternative design of connector.

Referring to FIG. 8, instead of the axially extending splines or teeth 26, 28 of FIGS. 4 to 7, the nut 18 and locking collar 14 could be provided with axially facing teeth 226, 228. As may be seen in FIG. 8, the teeth 226, 228 may be ratchet teeth, allowing the nut 18 to be further tightened, but not loosened, with the locking collar 14 in the locking position. Where locking teeth are used, the dimensions and positions of the spring 16, the groove 34, and the gland groove 24, especially the ramp 60, are chosen so that the spring 16 exerts a force on the ratchet teeth that holds them in engagement while allowing them to ratchet. The embodiment of FIG. 8 may be otherwise the same as the embodiment of FIGS. 4 to 7 and, in the interests of conciseness, the description is not repeated.

Figure 9:
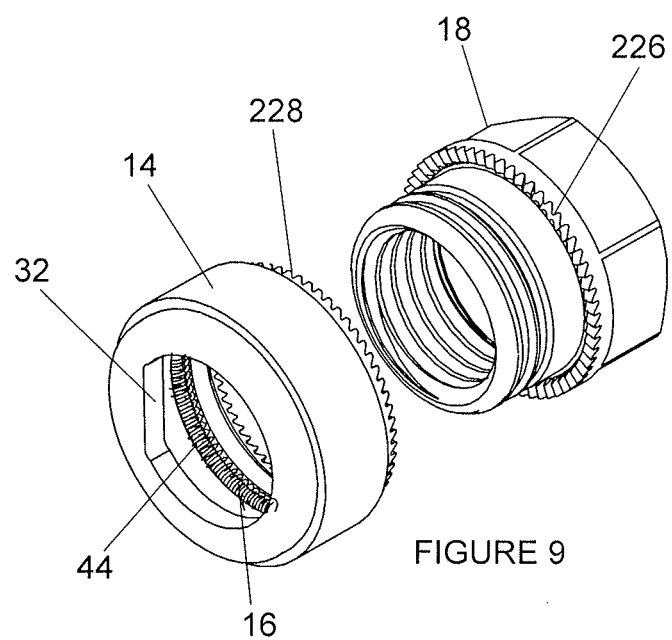
FIG. 9: is an isometric view of parts of another design of connector.

Referring to FIG. 9, the teeth 226, 228 may be positioned externally at the rear end of the locking collar 14, between the locking collar 14 and the hexagonal formation 64 on the nut 18, as was shown for the splines 26, 28 in FIGS. 4 to 7. Conversely, the splines 26, 28 may be placed inside the front end of the locking collar 14, as was shown for the ratchet teeth 226, 228 in FIG. 8.

Figure 10:
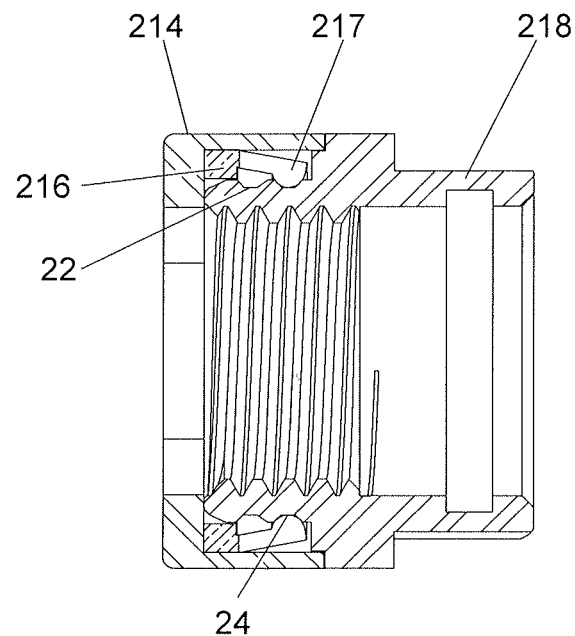
FIG. 10 is an axial section through parts of a further design of connector.

Referring to FIG. 10, another form of connector is generally similar to the connectors shown in FIGS. 4 to 9 except that instead of the canted coil spring 16 in the groove 44, the locking collar 214 is provided with a ring 216 carrying one or more spring fingers 217 that engage in the gland grooves 22, 24 of the nut 218. The collar 216 may be a friction fit within the locking collar 214, or may be held in place by adhesive, welding, or other suitable method. The ring 216 and spring fingers 217 may be molded from plastic, avoiding the concerns that may arise from using a metal spring 16 in some environments.

Figure 11:
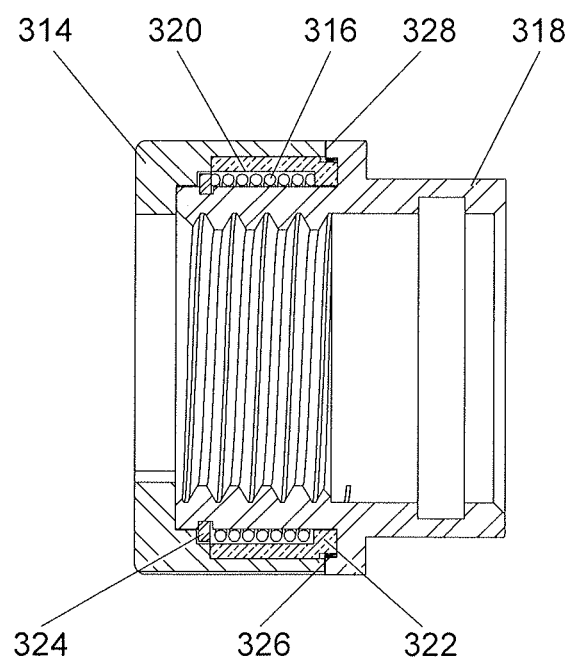
FIG. 11 is an axial section through parts of another design of connector.

Referring to FIG. 11, another form of connector is generally similar to the connectors shown in FIGS. 4 to 9 except that an axial compression spring 316 is arranged between the locking collar 314 and the nut 318, urging them into the locking position. For ease of assembly, a sleeve 320 is positioned over the front end of the nut 318, abutting a shoulder on the nut. The spring 316 is inserted over the locking collar 314 and inside the sleeve 320, bearing against a flange 322 at the rear end of the sleeve 320, and secured in place by a snap ring 324. The locking collar 314 is then positioned over the snap ring 324 and sleeve 320, and fixed to the sleeve 320 by friction, adhesive, welding, or another suitable method. In the locked position, the sleeve 320 is locked to the nut 318 by splines 326, 328.

In the form of connector shown in FIG. 11, the locking collar 314 does not snap between locked and unlocked positions, but is permanently spring biased into the locked position, and is unlocked by pulling the locking collar 314 forward against the spring 316. That may be less easy to install and remove, because the locking collar 314 must be held in the unlocked position while turning the nut 318, but it is much less likely that the installer will inadvertently leave the locking collar 314 in an unlocked condition.

The embodiments described have a keyway 30 in the form of a D-flat, and a key 32 in the form of a chordal flat that mates with the D-flat 30. Shapes of key 32 and keyway 30 other than a D-flat are of course possible. However, external screw threads with a D-flat are widely used for other purposes, and a locking collar 14 with a chordal flat 32 may be compatible even with a third-party connector member 10 that was provided with a D-flat 30 for another purpose and was not originally intended for use with the present connectors. The chordal flat 32 may be deliberately dimensioned in order to be compatible with a specific third-party connector member 10, or with a formal or informal standard for such connectors. The choice of the D-flat shape for the key and keyway is therefore in many cases very advantageous.

Figure 12:
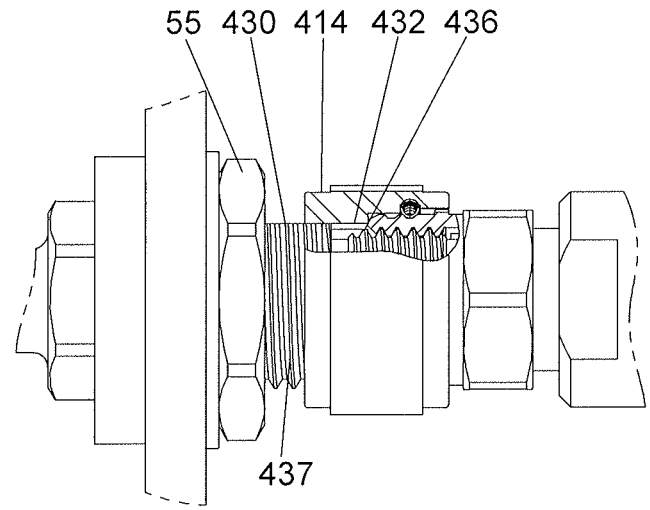
FIG. 12 is an axial section through parts of another design of connector.

Referring to FIG. 12, in other embodiments of the connector member 10, a D-flat may be provided on a larger secondary diameter 437 at the rear or proximal end of the external thread 436. In that case, the locking sleeve 414 may be provided with an axial extension of suitable diameter, and the extension may be formed with a chordal flat 432 corresponding to the available D-flat 430.

Figure 13:
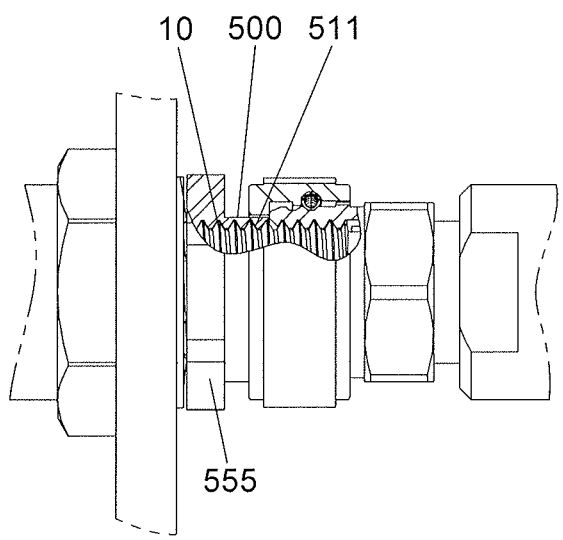
FIG. 13 is an axial section through parts of another design of connector.

Referring to FIG. 13, if it is desired to use the present connector with a connector member 10 that does not have a D-flat or other keyway, a collar with a suitable D-flat 500 may be provided that is fitted over the threaded distal end of the connector member 10 and is secured in place non-rotatably by solder, thread-locker, or other suitable expedient 511. Alternatively, one of the flat faces of the nut 555 may be used as the keyway.

In FIGS. 4 to 7, the groove 34 is formed on the inside of the locking collar 14, while the gland grooves 22, 24 are formed on the outside of the nut 18. The positions could of course be interchanged, so that the groove 34 is formed on the outside of the nut 18, while the gland grooves 22, 24 are formed on the inside of the locking collar 14. The other embodiments may be modified analogously.

The preceding description of the presently contemplated best mode of practicing the invention is not to be taken in a limiting sense, but is made merely for the purpose of describing the general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

Thus the claims endeavor to cover the described and illustrated embodiment and all modifications which come within the true intent and scope of the invention. The full scope of the invention should be determined with reference to the Claims.

We claim:

1. A self-locking connector comprising:
   a connector body having a distal end comprising a connecting interface;
   a nut having an internal thread with major and minor diameters captive on the distal end of the connector body encircling the connecting interface and configured to screw onto a corresponding externally threaded connector member; and
   a locking collar that is dimensioned with an internal diameter greater than the major thread diameter of the nut, that has at least one key projecting radially inward, and that is movable axially on the nut between a first position in which the nut is rotatable relative to the collar and a second position in which the nut is not rotatable relative to the collar, wherein the locking collar is captive on the nut for movement between the first position and the second position.

2. A connector according to claim 1, further comprising a retainer operative to resist movement of the locking collar away from the second position.

3. A connector as set forth in claim 2, wherein the retainer snaps or makes an audible click when said sleeve enters at least said second position.

4. A connector according to claim 1, further comprising a resilient retainer on one of the nut and the locking collar, and a pair of grooves on the other of the nut and the locking collar, wherein the retainer seats in one of the pair of grooves in the first position and seats in the other of the pair of grooves in the second position.

5. A connector according to claim 1, wherein said at least one key comprises a chordal portion projecting radially from the internal diameter of the locking collar to within the minor thread diameter of the nut.

6. A connector according to claim 1, wherein said at least one key projects radially within the major thread diameter of the internally threaded nut.

7. A connector according to claim 1, wherein the axial length of the key is greater than the axial spacing between the threads of the internally threaded nut.

8. A connector according to claim 1, wherein the nut and the locking collar have teeth that mate in the second position to prevent relative rotation.

9. A connector according to claim 8 wherein the mating teeth have faces that extend radially and are oblique to axial and circumferential directions, such that rotation of the nut relative to the locking collar in a direction to tighten the nut tends to cause the locking collar to move out of the second position and permit such rotation, and have faces that extend radially and axially that engage in the second position so as to prevent rotation of the nut in a direction to loosen the nut.

10. A connector system comprising a self-locking connector according to claim 1 in combination with:
    a connector member having an external thread and an axially extending keyway configured to receive and engage the key of the retaining collar, and having a connecting interface at a distal end configured to mate with the connecting interface of the connector body when the nut is screwed onto the external thread.

11. A connector system comprising a connector according to claim 1 in combination with a counter member having an axially extending keyway configured to receive and engage the key of the retaining collar, said counter member having an internal thread corresponding to said internal thread of said nut.

12. A self-locking connector comprising:
    a connector body having a distal end comprising a connecting interface;
    a nut having an internal thread with major and minor diameters captive on the distal end of the connector body encircling the connecting interface and configured to screw onto a corresponding externally threaded connector member; and
    a locking collar that is dimensioned with an internal diameter greater than the major thread diameter of the nut, that has at least one key projecting radially inward, and that is movable axially on the nut between a first position in which the nut is rotatable relative to the collar and a second position in which the nut is not rotatable relative to the collar further comprising a resilient retainer on one of the nut and the locking collar, and a pair of grooves on the other of the nut and the locking collar;
    wherein the retainer seats in one of the pair of grooves in the first position and seats in the other of the pair of grooves in the second position; and
    wherein the retainer comprises a canted coil spring seated in a groove on the said one of the nut and the locking collar.

13. A connector according to claim 12, wherein the canted coil spring and grooves are so dimensioned that the canted coil spring seats in said pair of grooves without axial play.

14. A self-locking connector, comprising:
    a connector body having a distal end comprising a connecting interface;
    a nut having an internal thread with major and minor diameters captive on the distal end of the connector body encircling the connecting interface and configured to screw onto a corresponding externally threaded connector member; and
    a locking collar that is dimensioned with an internal diameter greater than the major thread diameter of the nut, that has at least one key projecting radially inward, and that is movable axially on the nut between a first position in which the nut is rotatable relative to the collar and a second position in which the nut is not rotatable relative to the collar further comprising a resilient retainer on one of the nut and the locking collar, and a pair of grooves on the other of the nut and the locking collar, wherein the retainer seats in one of the pair of grooves in the first position and seats in the other of the pair of grooves in the second position;
    wherein the sides of the pair of grooves are sloped at different angles, and wherein the angles determine the relative forces required to initiate movement from the first position to the second position, movement from the second position to the first position, and removal of the locking collar from the distal end of the nut.

15. A self-locking connector system, comprising:
    a connector member having an external thread and an axially extending keyway, wherein the keyway extends along the external thread of the connector member, and a connecting interface at a distal end;
    a connector body having a distal end comprising a connecting interface operative to mate with that of the connector member;
    an internally threaded nut captive on the distal end of the connector body encircling the connecting interface and configured to screw onto the externally threaded connector member; and
    a locking collar that is dimensioned to encircle the externally threaded connector member, that has at least one key dimensioned to engage in said keyway, and that is movable axially on the nut between a first position in which the nut is rotatable relative to the collar and a second position in which the nut is not rotatable relative to the collar.

* * * * *